United States Patent
Derbis

(10) Patent No.: US 10,286,847 B2
(45) Date of Patent: May 14, 2019

(54) POWERED RUNNING BOARD ASSEMBLY AND METHOD OF OPERATION

(71) Applicant: FORD GLOBAL TECHNOLOGIES, LLC, Dearborn, MI (US)

(72) Inventor: Leszek Derbis, Auburn Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/419,494

(22) Filed: Jan. 30, 2017

(65) Prior Publication Data

US 2018/0215317 A1    Aug. 2, 2018

(51) Int. Cl.
*B60R 3/02* (2006.01)
*B60R 3/00* (2006.01)
*B60R 16/00* (2006.01)
*G05D 3/00* (2006.01)

(52) U.S. Cl.
CPC .............. *B60R 3/02* (2013.01); *B60R 3/002* (2013.01); *B60R 16/005* (2013.01); *B60Y 2400/412* (2013.01); *G05D 3/00* (2013.01)

(58) Field of Classification Search
None
See application file for complete search history.

(56) References Cited

U.S. PATENT DOCUMENTS

| | | | |
|---|---|---|---|
| 6,135,472 A | 10/2000 | Wilson et al. | |
| 7,070,194 B2 | 7/2006 | Garland et al. | |
| 7,377,531 B2 | 5/2008 | Fabiano et al. | |
| 7,469,916 B2 | 12/2008 | Watson | |
| 7,673,902 B2 * | 3/2010 | Jayasuriya | B60R 3/002 280/755 |
| 8,366,129 B2 | 2/2013 | Salmon et al. | |
| 9,174,581 B2 | 11/2015 | Cha et al. | |
| 9,403,487 B1 | 8/2016 | Diehl et al. | |
| 9,539,948 B1 * | 1/2017 | Presley | B60R 3/02 |

FOREIGN PATENT DOCUMENTS

GB    2045699 A    11/1980

* cited by examiner

*Primary Examiner* — Paul N Dickson
*Assistant Examiner* — Hilary L Johns
(74) *Attorney, Agent, or Firm* — Jason Rogers; Vichit Chea; King & Schickli, PLLC

(57) ABSTRACT

A powered running board assembly includes a running board and an actuator to displace the running board between a stowed position and a deployed position. That actuator includes a housing and a telescoping arm oriented along a first axis oblique to the running board. A related method of operating a running board is also disclosed.

13 Claims, 5 Drawing Sheets

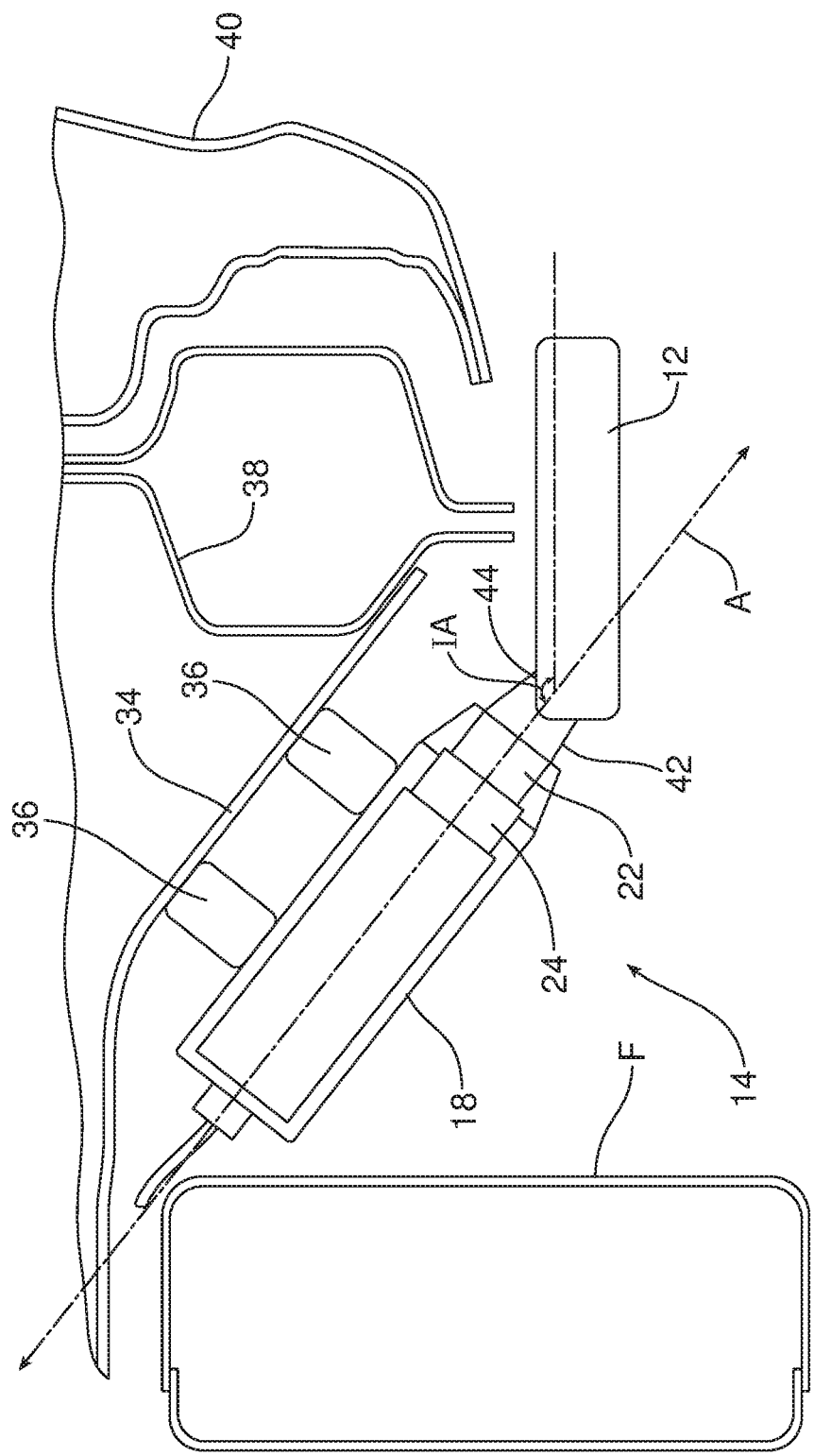

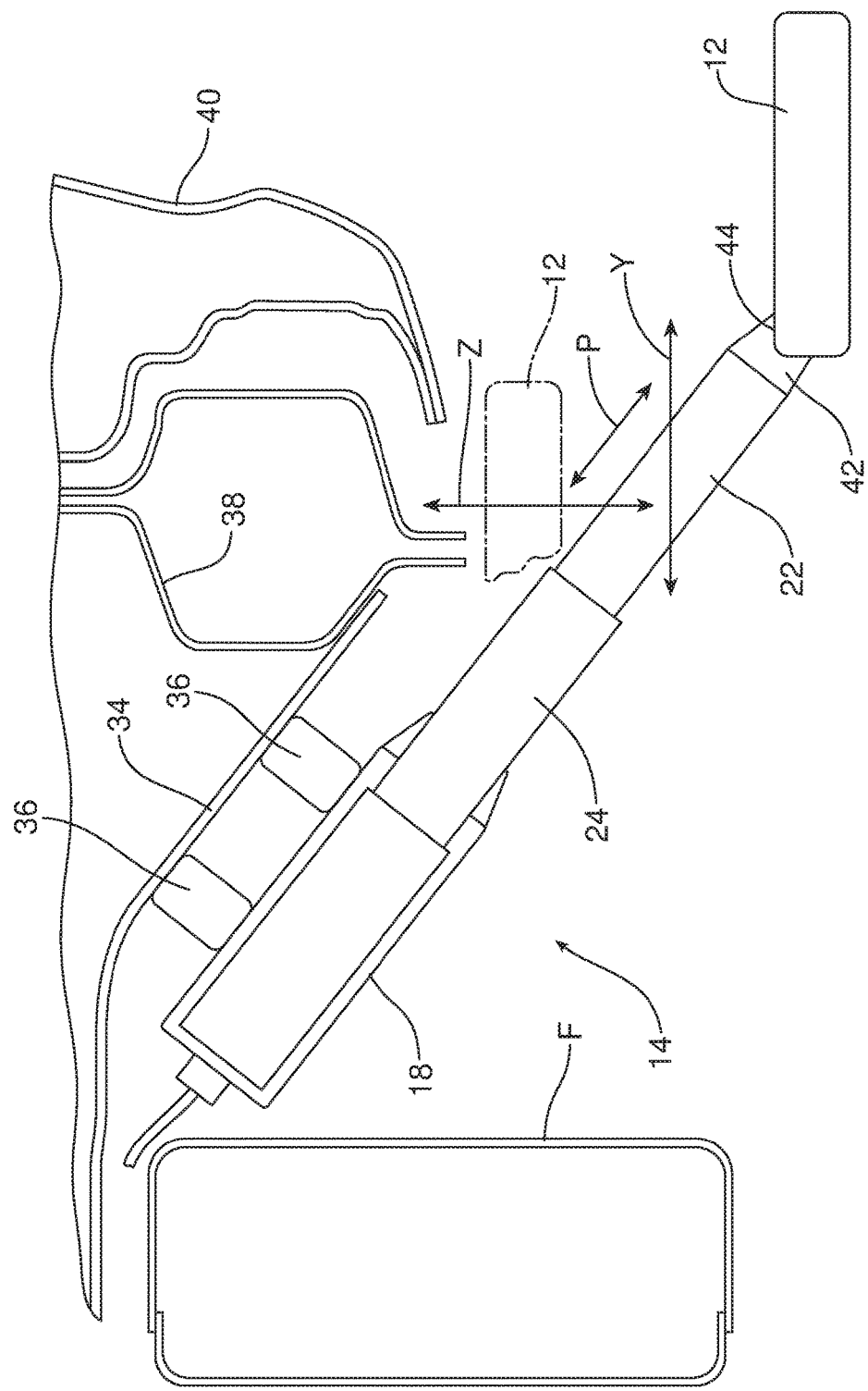

POWERED RUNNING BOARD ASSEMBLY AND METHOD OF OPERATION

TECHNICAL FIELD

This document relates generally to the motor vehicle equipment field and, more particularly, to a new and improved powered running board assembly and related method of operation free of complicated linkages and pivot joints in order to reduce maintenance requirements and provide operational integrity over a long service life.

BACKGROUND

State of the art powered running board assemblies typically employ actuator mechanisms with relatively complicated linkages including one or more pivoting joints. It is not uncommon for these pivoting joints to use steel and polytetrafluoroethylene bushing bearings that allow for galvanic corrosion in contact with the aluminum materials utilized to make the other component parts of the linkages that house these bushings. Over time this corrosion may lock the linkages and cause them to malfunction.

This document relates to a new and improved powered running board assembly that is void of pivoting joints and provides for simple linear movement of the powered running board between a stowed inboard and raised position and a deployed outboard and lowered position.

SUMMARY

In accordance with the purposes and benefits described herein, a powered running board assembly is provided. That powered running board assembly comprises a running board and an actuator to displace that running board between a stowed position and a deployed position. The actuator includes a housing and a telescoping arm oriented along a first axis oblique to the running board. The stowed position is provided inboard and raised with respect to the deployed position and the deployed position is provided outboard and lowered with respect to the stowed position.

The telescoping arm may include a distal end connected to the running board at a fixed included angle. Such a configuration provides for the running board to travel along a linear path between the stowed position and the deployed position. The fixed included angle may be between 91 degrees and 179 degrees. The fixed included angle may be between 100 degrees and 170 degrees. The fixed included angle may be between 110 degrees and 160 degrees. The fixed included angle may be between 120 degrees and 150 degrees. The fixed included angle may be between 125 degrees and 145 degrees. The fixed included angle may be between 130 degrees and 140 degrees. The fixed included angle may be between 134 degrees and 136 degrees. Further, the fixed included angle may be 135 degrees.

The powered running board assembly may further include a second actuator to displace the running board between the stowed position and the deployed position. That second actuator may include a second housing and a second telescoping arm oriented along a second axis oblique to the running board and parallel to the first axis. The second telescoping arm may include a second distal end connected to the running board at the same fixed included angle.

In accordance with an additional aspect, a method is provided of operating a powered running board on a motor vehicle including a door, a Y-axis and a Z-axis. That method comprises the step of displacing the running board, by actuator, along a linear path oblique to the Y-axis and the Z-axis between a stowed position and a deployed position.

The method may further include the step of locating the stowed position inboard of the door and the deployed position outboard of the door. Further, the method may include locating the stowed position above the deployed position.

Still further, the method may include the step of connecting the actuator to the powered running board at a fixed included angle. In addition, the method may include the step of excluding pivot joints from the actuator to reduce the maintenance requirements.

The method may also include moving the powered running board upward and inward from the deployed position to the stowed position. Further, the method may include moving the powered running board downward and outward from the stowed position to the deployed position.

In the following description, there are shown and described several preferred embodiments of the powered running board assembly and the related operating method. As it should be realized, the powered running board assembly and related method are capable of other, different embodiments and their several details are capable of modification in various, obvious aspects all without departing from the powered running board assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the powered running board assembly and the related method of operating a powered running board assembly and together with the description serves to explain certain principles thereof.

FIG. 2a is a schematic end elevational view illustrating the powered running board assembly of FIG. 1 with the running board in the stowed position.

FIG. 2b is a view similar to FIG. 2a but illustrating the running board in the deployed position.

Figure 1:
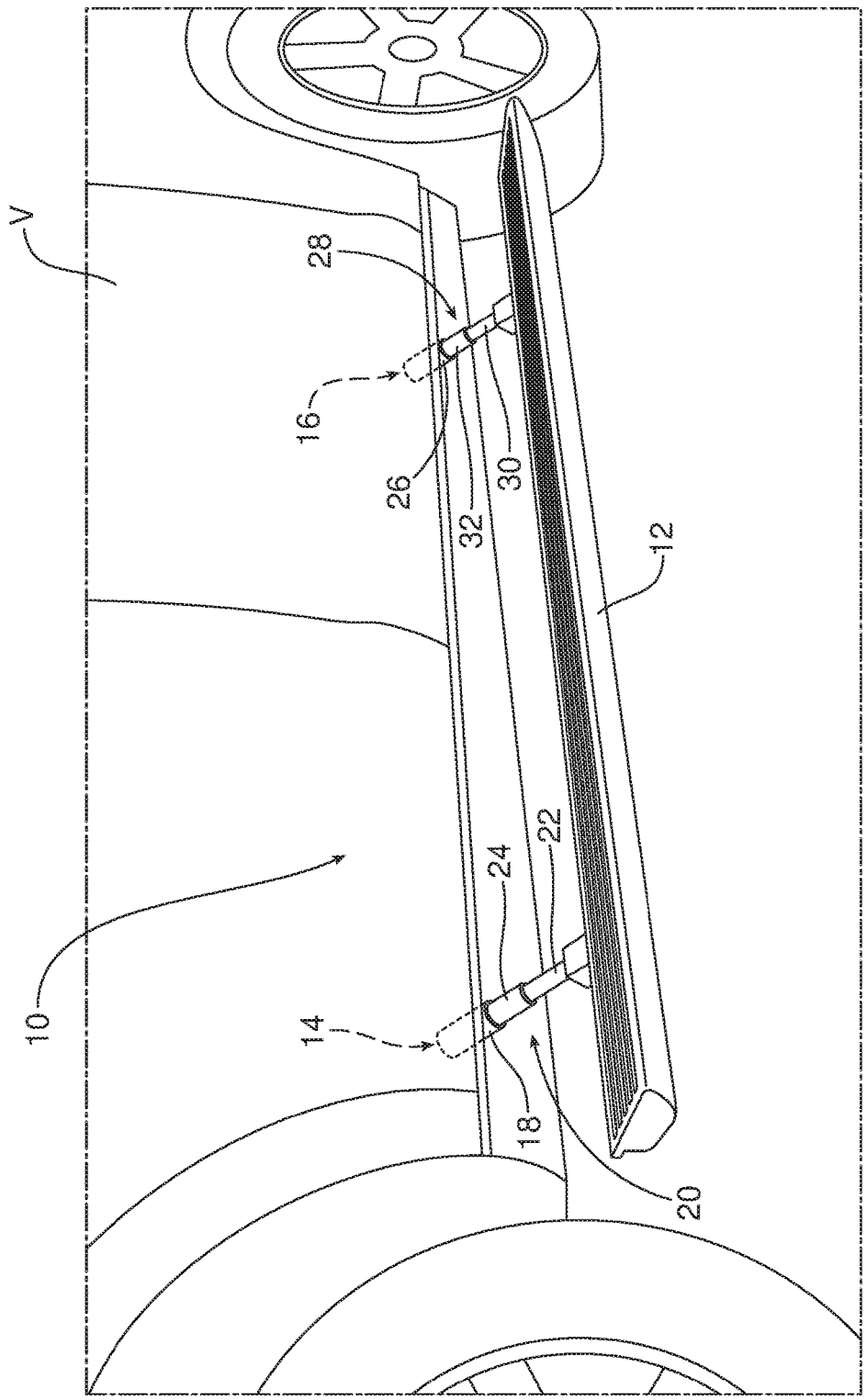
FIG. 1 is a perspective view of the new and improved powered running board assembly on a motor vehicle.

Reference will now be made in detail to the present preferred embodiments of the powered running board assembly, examples of which are illustrated in the accompanying drawing figures.

DETAILED DESCRIPTION

Reference is now made to FIGS. 1, 2a, 2b, 3a and 3b illustrating one possible embodiment of the new and improved powered running board assembly 10 for a motor vehicle V. As illustrated, the powered running board assembly 10 includes a running board 12 and an actuation system including a first actuator 14 and a second actuator 16. The first actuator 14 includes a housing 18 and a telescoping arm 20. The telescoping arm has a first stage 22 and a second stage 24.

Similarly, the second actuator 16 includes a second housing 26 and a second telescoping arm 28. That second telescoping arm 28 has a first stage 30 and a second stage 32. The first actuator 14 and the second actuator 16 both have vertical and side load carrying capabilities.

As illustrated in FIGS. 1, 2a and 2b, the first housing 18 is secured to the cross member 34 of the motor vehicle by means of mounting brackets 36 inboard of the rocker 38 and door 40 of the motor vehicle V. Hidden behind the first housing 18, the second housing 26 is mounted in the same manner.

The first actuator 14 and second actuator 16 of the tandem actuator system are mounted in parallel so that the first housing 18 and first telescoping arm 20 are aligned with the second housing 26 and second telescoping arm 28. The first housing 18 and first telescoping arm 20 as well as the second housing 26 and second telescoping arm 28 are both oriented along a first axis A that is oblique to the running board 12.

The distal end 42 of the first telescoping arm 20 is connected to the running board 12 at a joint 44 defining a fixed included angle IA. Similarly, the distal end 46 of the second telescoping arm 28 is connected to the running board at a joint (not shown) at the same fixed included angle.

That fixed included angle may be between 120 and 150 degrees. In some possible embodiments, that fixed included angle may be between 125 and 145 degrees. In some possible embodiments, that fixed included angle may be between 130 and 140 degrees. In still other possible embodiments, that fixed included angle may be between 134 and 136 degrees. In still other possible embodiments that fixed included angle may be 135 degrees.

As should be appreciated from viewing FIGS. 2a and 2b, the stowed position of the running board 12 illustrated in FIG. 2a is inboard and raised with respect to the deployed position of the running board illustrated in FIG. 2b whereas the deployed position is outboard and lowered with respect to the stowed position. As should also be apparent from viewing FIGS. 2a and 2b, the running board 12 travels along a linear path between the stowed position and the deployed position. That linear path extends along the first axis A.

The first actuator 14 and the second actuator 16 include respective telescoping arms 20, 28 and may be powered by electromechanical, pneumatic, hydraulic or other means. In the embodiment illustrated in FIGS. 3a and 3b, the first actuator 14' includes a lead screw 50 that is driven by the drive motor 52 in response to the controller 54. The controller 54 may comprise a computing device such as a dedicated microprocessor or electronic control unit (ECU) operating in accordance with instructions from appropriate control software. As such, the controller 54 may comprise one or more processors, one or more memories and one or more network interfaces all in communication with each other over a communication bus. In the illustrated embodiment, the controller 54 is also connected to a first control switch 56 for retracing the telescoping arm 20 and displacing the running board 12 to the stowed position and a second control switch 58 for extending the telescoping arm 20 and displacing the running board to the deployed position.

Figure 3A:
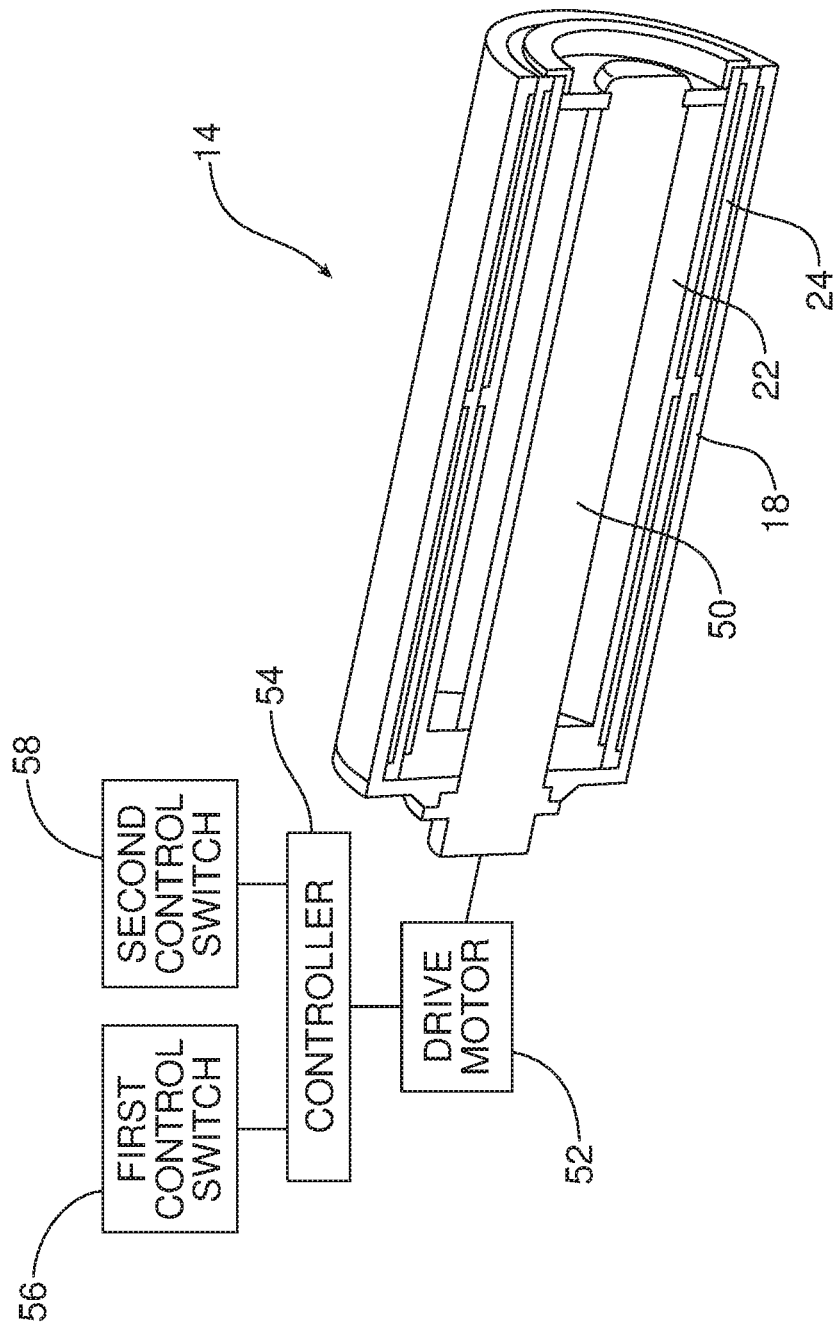
FIG. 3a is a detailed cross sectional view of one possible embodiment of the actuator utilized to displace the running board between the stowed position and the deployed position wherein the telescoping arm of that actuator is retracted.

FIG. 3a illustrates the first actuator 14 in the retracted configuration which corresponds to the stowed position of the running board 12. When the second control switch 58 is manipulated, the controller 54 sends a control signal to the drive motor 52 causing the drive motor to drive the lead screw 50 in a direction of rotation causing the thread engaging end 60 of the telescoping arm 20 to be displaced down the length of the lead screw from the proximal end 62 to the lead screw support 64 at the distal end 66 of the lead screw. This causes the first stage 22 of the telescoping arm 20 to telescope or extend out of the second stage 24 and the second stage to telescope or extend out of the housing 18. Once the telescoping arm 20 is fully extended, the running board 12 is in the deployed position. In this position, the running board 12 is oriented and positioned for easy access and use so that one may step upon and enter the passenger compartment of the motor vehicle after opening the door 40.

Figure 3B:
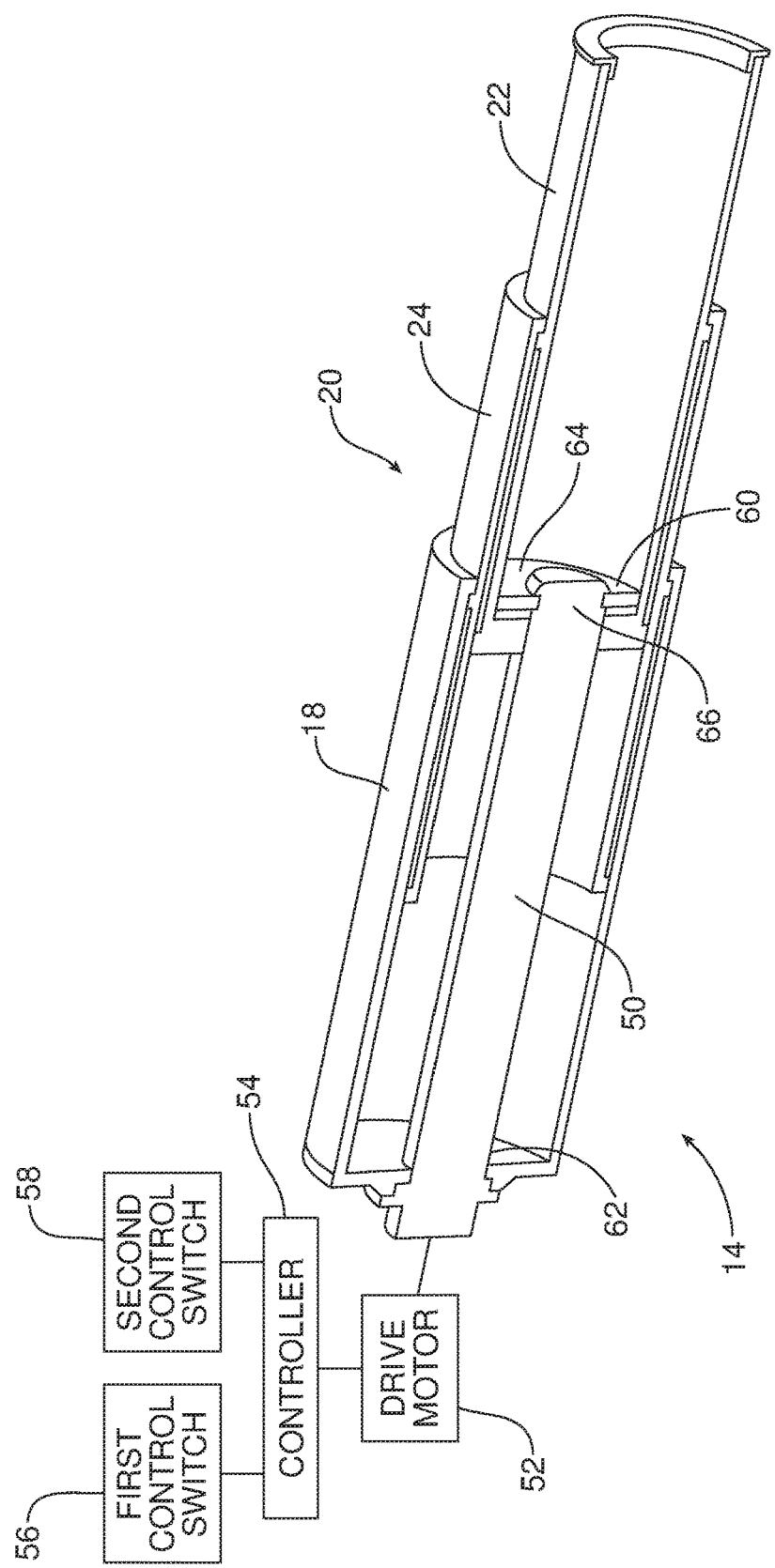
FIG. 3b is a view similar to FIG. 3a but showing the telescoping arm in the extended position.

While not shown, the second actuator 16 would have the same internal construction and operate in the same manner as the first actuator 14 illustrated in FIGS. 3a and 3b.

When one wishes to retract the first actuator 14 and displace the running board from the deployed position to the stowed position, one would manipulate the first control switch 56. In response, the controller 54 would send a control signal to the drive motor 52 causing the lead screw 50 to be driven in the opposite direction. This would result in the first stage 22 retracting into the second stage 24 and the second stage 24 retracting into the housing 18 thereby returning the first actuator to the fully retracted position illustrated in FIG. 3a which corresponds to displacing the running board into the stowed position shown in FIG. 2a. In the stowed position, the running board 12 is raised above the bottom of the frame F of the motor vehicle V adjacent the rocker 38. This positioning of the running board 12 maximizes the ground clearance of the motor vehicle V and protects the running board 12 from inadvertent contact with obstructions during off road use.

As should be further appreciated, a method is provided for operating a powered running board assembly 10 on a motor vehicle V including a door 40, a lateral or Y-axis and a vertical or Z-axis (see FIGS. 2a and 2d). That method comprises displacing the running board by actuator 14, 16, along a linear path P oblique to the Y-axis and Z-axis between the stowed position illustrated in FIG. 2a and the deployed position illustrated in FIG. 2b. As illustrated, the stowed position is located inboard of the outer face of the door 40 and the deployed position is outboard of the outer face of the door. Further, the stowed position is located above the deployed position.

As previously noted the method also includes connecting the actuator 14 to the running board 12 and the second actuator 16 to the running board 12 at a fixed included angle at the respective joints 44.

In addition, as should be appreciated, the method includes excluding any pivot joints from the actuator 14 or 16. This is done to minimize moving parts and reduce maintenance requirements so as to provide for a long service life.

As should be appreciated, the geometry of the powered running board assembly 10 allows for moving of the running board downward and outward along a bias from the stowed position to the deployed position and upward and inward along that bias from the deployed position to the stowed position.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A powered running board assembly, comprising:
   a running board; and
   a pivot-joint-free actuator to displace said running board along a linear path between a stowed position and a deployed position, said actuator including a housing and a telescoping arm oriented along a first axis oblique to said running board, wherein said telescoping arm includes a distal end connected to said running board at a fixed included angle between 120 degrees and 150 degrees.

2. The powered running board assembly of claim 1, wherein said stowed position is inboard and raised with respect to said deployed position and said deployed position is outboard and lowered with respect to stowed position.

3. The powered running board assembly of claim 2, wherein said running board travels along a linear path between said stowed position and said deployed position.

4. The powered running board assembly of claim 1, wherein said fixed included angle is between 125 degrees and 145 degrees.

5. The powered running board assembly of claim 1, wherein said fixed included angle is between 130 degrees and 140 degrees.

6. The powered running board assembly of claim 1, wherein said fixed included angle is between 134 degrees and 136 degrees.

7. The powered running board assembly of claim 1, further including a second pivot-joint-free actuator to displace said running board along a linear path between said stowed position and said deployed position, said second actuator including a second housing and a second telescoping arm oriented along a second axis oblique to said running board and parallel to said first axis.

8. The powered running board assembly of claim 7, wherein said second telescoping arm includes a second distal end connected to said running board at said fixed included angle.

9. A method of operating a running board on a motor vehicle including a door, a Y-axis, and a Z-axis, comprising:
   displacing said running board, by actuator, along a linear path oblique to said Y-axis and said Z-axis between a stowed position and a deployed position;
   connecting said actuator to said running board at a fixed included angle; and
   excluding pivot joints from said actuator to reduce maintenance.

10. The method of claim 9, including locating said stowed position inboard of said door and said deployed position outboard of said door.

11. The method of claim 10, including locating said stowed position above said deployed position.

12. The method of claim 9, including moving said running board upward and inward from said deployed position to said stowed position.

13. The method of claim 9, including moving said running board downward and outward from said stowed position to said deployed position.

* * * * *